United States Patent
Wenk

(10) Patent No.: US 11,623,682 B2
(45) Date of Patent: Apr. 11, 2023

(54) STEER-BY-WIRE STEERING SYSTEM HAVING A SPINDLE DRIVE

(71) Applicant: ZF Friedrichshafen AG, Friedrichshafen (DE)

(72) Inventor: Stefan Wenk, Hemsloh (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 277 days.

(21) Appl. No.: 16/973,484

(22) PCT Filed: May 21, 2019

(86) PCT No.: PCT/EP2019/063050
§ 371 (c)(1),
(2) Date: Dec. 9, 2020

(87) PCT Pub. No.: WO2019/242963
PCT Pub. Date: Dec. 26, 2019

(65) Prior Publication Data
US 2021/0237795 A1     Aug. 5, 2021

(30) Foreign Application Priority Data
Jun. 18, 2018   (DE) .................. 10 2018 209 819.0

(51) Int. Cl.
*B62D 5/04*   (2006.01)
*F16H 25/22*  (2006.01)
*F16H 25/20*  (2006.01)

(52) U.S. Cl.
CPC ....... *B62D 5/0451* (2013.01); *F16H 25/2266* (2013.01); *F16H 2025/2081* (2013.01); *F16H 2025/2276* (2013.01)

(58) Field of Classification Search
CPC .................................................. B62D 5/0451
See application file for complete search history.

(56) References Cited

U.S. PATENT DOCUMENTS

| | | |
|---|---|---|
| 4,526,053 A | 7/1985 | Carson |
| 4,615,229 A | 10/1986 | Granbom |
| 4,836,338 A | 6/1989 | Taig |
| 10,823,275 B2 | 11/2020 | Abevi et al. |

(Continued)

FOREIGN PATENT DOCUMENTS

| | | |
|---|---|---|
| DE | 689 07 481 T2 | 12/1993 |
| DE | 100 11 140 A1 | 11/2000 |
| DE | 101 14 308 A1 | 8/2001 |

(Continued)

OTHER PUBLICATIONS

NN: "Spielfreier Rollgewindetrieb", May 1, 1995, F & M. Feinwerktechnik Mikrotechnik Messtechnik, Hanser, Munchen, Germany, p. 255 (To Follow).

(Continued)

*Primary Examiner* — Kevin Hurley
(74) *Attorney, Agent, or Firm* — Finch & Maloney PLLC

(57) ABSTRACT

A spindle drive (20) for an actuator of a steer-by-wire steering system (10). The spindle drive has a linearly displaceable threaded spindle (27). The spindle drive (20) is in the form of a roller screw drive. The roller screw drive has a first efficiency in the driving direction and a second different efficiency in the reverse-driving direction.

10 Claims, 3 Drawing Sheets

(56) References Cited

U.S. PATENT DOCUMENTS 11,318,985 B2 * 5/2022 Tate .................. B62D 5/001

FOREIGN PATENT DOCUMENTS

| DE | 10 2005 035 872 A1 | 2/2007 |
| DE | 10 2014 221 090 A1 | 5/2015 |
| DE | 10 2015 211 432 A1 | 12/2016 |
| DE | 11 2015 006 889 T5 | 5/2018 |
| EP | 1 110 845 A1 | 6/2001 |
| WO | 2015/007309 A1 | 1/2015 |

OTHER PUBLICATIONS

German Office Action Corresponding to 10 2018 209 819.0 dated Mar. 29, 2019.
International Search Report Corresponding to PCT/EP2019/063050 dated Oct. 2, 2019.
Written Opinion Corresponding to PCT/EP2019/063050 dated Oct. 2, 2019.

* cited by examiner

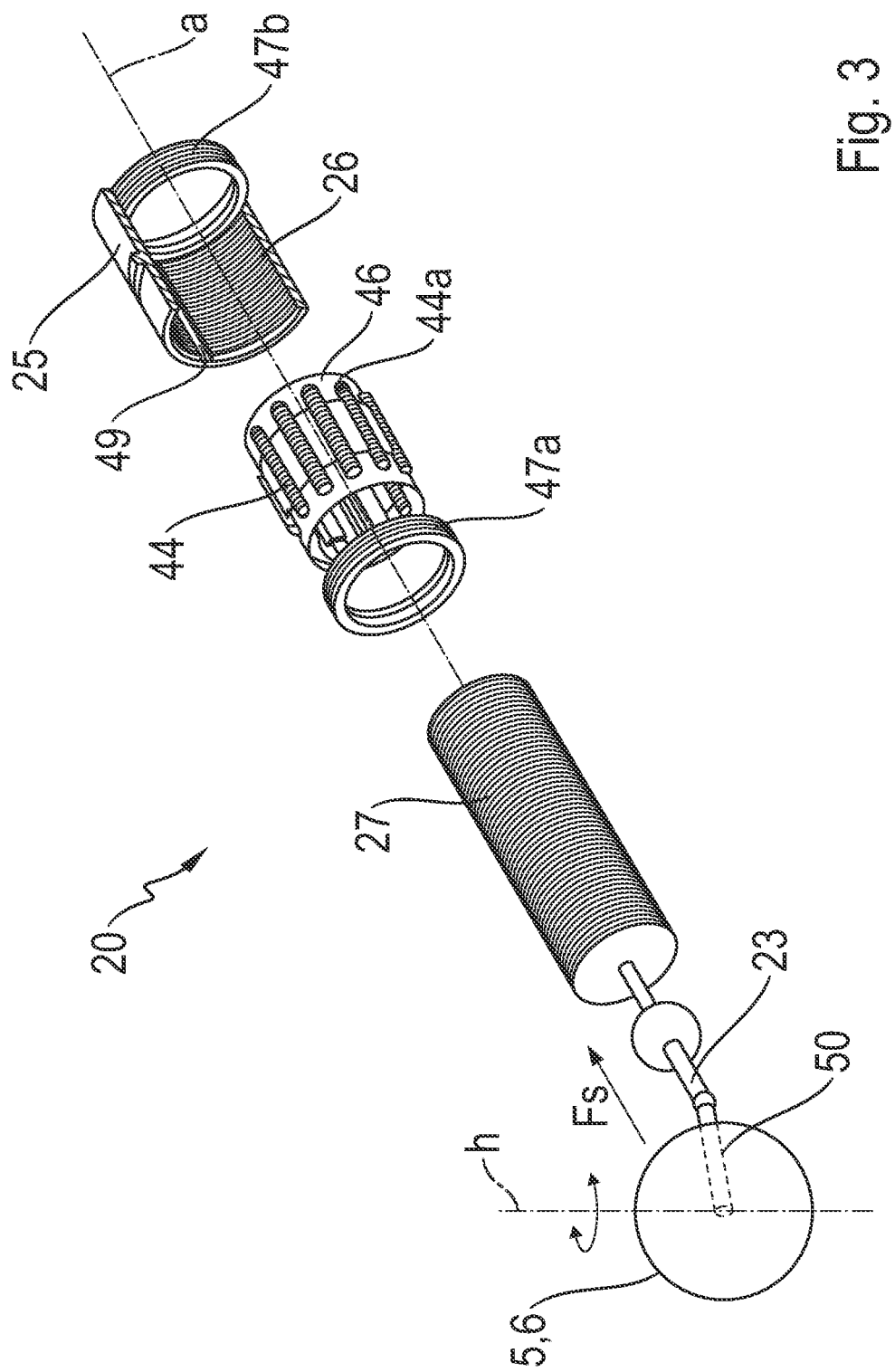

STEER-BY-WIRE STEERING SYSTEM HAVING A SPINDLE DRIVE

This application is a National Stage completion of PCT/EP2019/063050 filed May 21, 2019, which claims priority from German patent application serial no. 10 2018 209 819.0 filed Jun. 18, 2018.

FIELD OF THE INVENTION

The invention relates to a spindle drive for a steer-by-wire steering system and a steer-by-wire steering system.

BACKGROUND OF THE INVENTION

From DE 10 2005 035 872 A1 an electric motor actuator for steering the two wheels of an axle of a two-track motor vehicle is known. The actuator is made with a non-self-locking threaded spindle, by means of whose linear displacement an adjustment movement can be transmitted to the wheels. The threaded spindle is displaced linearly by means of a roller screw-thread drive in the form of a planetary roller screw drive. Since the spindle drive is not self-locking, a locking unit is provided which acts upon the rotor of the electric motor and can immobilize it in the manner of an electromagnetically actuated brake.

SUMMARY OF THE INVENTION

The purpose of the present invention is to improve an electric-motor-operated actuator.

The invention embodies the characteristics specified in the independent claims. Advantageous design features emerge from the subordinate claims.

The invention relates to a spindle drive for a steer-by-wire steering system, comprising a linearly displaceable threaded spindle, wherein the spindle drive is in the form of a roller screw drive. The invention is distinguished by the fact that the roller screw drive has different efficiencies in its driving direction and in its reverse-driving direction. A roller screw drive is distinguished by exceptionally low friction in the driving direction and, compared with ball screw drives or in particular trapezoidal screw drives, requires a comparatively small drive torque. By virtue of the roller screw drive comparatively little fitting space is required. Thereby, less fitting space is required for the spindle drive as a whole, i.e. the fitting space needed for the spindle drive and the steer-by-wire steering system, also called the package, is smaller and can therefore be more easily integrated in axle designs of motor vehicles. A lower drive torque also allows a comparatively smaller motor, which on account of its smaller fitting space, can likewise be integrated more easily in the steer-by-wire steering system. Moreover. roller screw drives need only very small amounts of lubricant, they have high inertia, and they ensure low-noise operation over a long lifetime and with a compact structure.

In the present spindle drive, the spindle nut is fitted in a fixed position in a housing of the actuator of the steer-by-wire steering system and is driven in rotation by an electric motor. The rotational movement of the spindle nut can be produced by a motor with its axis parallel, by means of a belt drive, but also by means of a coaxial motor or a motor of the type known as a hollow-shaft motor.

By virtue of the electric rotary drive, the spindle nut is moved in rotation and co-operates via the roller screw drive with the external thread of the spindle in such manner that ultimately the axial movement of the spindle in one or the other direction is produced. The displacement or movement of the threaded spindle produced by the spindle drive in the axial direction is understood in the present case to be the driving direction.

A steering system in a motor vehicle must keep the wheels in position relative to their track. The steering system guides the wheels relative to their lateral orientation with respect to the longitudinal axis of the vehicle. For example, if the wheels are deflected in one or the other direction while driving round a curve, lateral forces are exerted on the wheels due to the inclined rolling angle. Thus, the steering system must be capable of guiding the wheels even when lateral forces act upon them. In particular, the steering system must be designed such that additional, unexpected loads in excess of the normal lateral forces, for example due to impact with a curbstone or the like, can be withstood. In the spindle drive according to the invention, the component that produces the steering movement and guides the wheels is the axially displaceable threaded spindle. Depending on the design of the steering system, the threaded spindle is connected at one end or both ends, directly or indirectly to the wheel carrier(s) on which the respective wheel of the axle is arranged and can rotate. In the case of an indirect connection, control arms or so-termed track-rods are arranged between the threaded spindle and the wheel carrier. If while driving round a curve lateral forces act via the wheels upon the steering system, a force in the reverse-driving direction is produced on the spindle drive.

The previously mentioned advantage that a roller screw drive is affected by exceptionally little friction in the driving direction, means in other words that roller screw drives are characterized by high efficiency. For conventional roller screw drives such as planetary roller screw drives, this applies both in the forward and reverse driving direction. However, if for the spindle drive a lower, especially much lower efficiency is desired so that if lateral forces occur no automatic return of the steering, for example to the neutral position (steering angle equal to zero) takes place, then steering systems or spindle drives are known from the prior art, which comprise a brake or detent. For that purpose the spindle drive according to the invention is designed in such manner that in the driving direction the spindle drive has a high efficiency, so that in the driving direction the spindle drive is not self-locking. The high efficiency combines the aforesaid advantages of exceptionally low friction in the driving direction with a relatively low drive power needed for the electric motor.

Preferably, however, the efficiency of the roller screw drive in the reverse-driving direction is low enough for the roller screw drive to be essentially, and preferably completely, self-locking. In other words, the value of the efficiency in the reverse-driving direction is chosen such that when an axial force acts upon the spindle or threaded spindle, the spindle remains in position and is not displaced axially in the reverse-driving direction. To put it differently, an axial force acting on the threaded spindle does not give rise to an automatic rotation of the spindle nut. Thus, an axial force due to the lateral force of the wheels, for example when driving round a curve, does not result in a change of the steering angle, but rather, the wheels remain on the previously set track. This is advantageous, since no additional transmission or brake or some other inhibiting unit is needed in order to ensure self-locking in the reverse-driving direction. This enables the wheels to be guided in the reverse-driving direction. With self-locking, no axial displacement of the threaded spindle is possible.

Even in the event of a maximum force acting essentially axially on the threaded spindle in the reverse-driving direction, only a minimal torque is produced in the spindle drive. For this, the efficiency in the reverse-driving direction is designed to be correspondingly low. In this context, when an essentially axial force is mentioned, this means forces which meet or act upon the spindle at an angle from 0° to about 45° relative to the longitudinal axis. Depending on the design of the vehicle axle, this can be the case for example when control arms are arranged between the wheel carrier and the spindle as articulated connections.

In a further preferred embodiment, the torque produced in the reverse-driving direction corresponds approximately to the stall torque of the drive motor. Preferably, this torque is equal to the stall torque of the drive motor. The force acting on the threaded spindle produces a rotational movement of the spindle nut due to the aforesaid low torque. In the ideal case this minimal torque should only be of a size such that the stall torque of the drive motor is larger than or equal to it. The stall torque, also called the holding torque at rest, would thus have to be overcome for the motor to be set in rotary motion by the rotation of the spindle nut and for the spindle to be displaced axially. A passive stall torque may exist, which when the motor is not energized is for example produced due to the permanent magnet, so that the driveshaft of the motor does not rotate automatically. The holding torque or stall torque can also exist in active form if the motor is energized but is not turning. In other words, the stall torque of the drive unit, i.e. the electric motor, can compensate the retroactive torque produced by the axial force acting upon the threaded spindle in the reverse-driving direction. The stall torque can be regulated by controlling or regulating the motor, or in other words it can be variable. In this connection the gear ratio of the spindle drive or roller screw drive should additionally be taken into account.

In a preferred embodiment the roller screw drive is in the form of a roller screw drive with roller return. In contrast to the planetary roller screw drive, the rollers of the roller screw drive with roller return, which are also arranged around the spindle with their axes parallel to the longitudinal axis of the threaded spindle, move more quickly in the axial direction than the spindle nut. Accordingly, the rollers have to be lifted away from the spindle and displaced backward by a special geometry at the nut. Since the rollers move radially and axially relative to the nut, they cannot—as in a planetary roller screw drive—be guided by guide-rings arranged at the axial ends of the rollers, which rings are fixed in the spindle nut. Instead, the rollers of the roller screw drive with roller return are held radially in position by a kind of cage. With the roller screw drive with roller return the decisive advantage is obtained, that the pitch is the minimum possible, which is even smaller than in a planetary roller screw drive. The thread of the rollers has no pitch, so that the pitch of the spindle can be chosen finer than with a planetary roller screw drive. For example, in the case of a threaded spindle with a diameter of 32 mm, a pitch of 1 mm can be chosen. In the reverse-driving direction there is in such a case a theoretical efficiency for example of 25 to 30%. By designing the roller screw drive with roller return and having regard to influences such as lubrication and friction, ultimately a practical efficiency for example of only 4 to 7% is obtained. With an exemplary unexpected load (a maximum possible lateral force such as 50 kN), a reverse-driving torque can be reached, which has to be opposed by the motor as a stall torque. In the present example this stall torque is, for example, around 0.22 to 0.25 Nm. By virtue of the stall torque of the electric motor, such a small torque can be compensated. Thus, as a result the stall torque of the electric motor is sufficient to prevent any axial displacement of the threaded spindle in the reverse-driving direction due to a lateral force on the threaded spindle produced by the wheels of the vehicle axle. The wheel-guiding action is preserved.

Preferably, a distinguishing feature of the spindle drive is that to immobilize the spindle drive an inhibiting unit can be provided. The inhibiting unit is preferably actuated electromagnetically and produces a coupling between the spindle nut and the actuator and/or between the spindle and the actuator and/or between the spindle and the spindle nut. The inhibiting unit is preferably electromagnetically actuated such that when the inhibiting unit is energized it opens, so that if a failure of the operating voltage occurs, the inhibiting unit is shifted under spring loading in the locking or braking direction. With the additional inhibiting unit, a mechanical lock can be created such that the rotation of the electric motor is impeded. This can be necessary and therefore advantageous when, for example, in a parked vehicle no steering movement at all should any longer be possible. An inhibiting unit can also be provided in order to brake or delay the movement of the spindle nut and/or the threaded spindle. It is also possible, for example, in the event that the electric motor fails, for the spindle to wander in a direction due to dynamic loads in the vehicle chassis and result in an unintended change of the steering angle. Dynamic loads are varying loads resulting from varying force directions, which can act upon the spindle drive via wheel guiding control arms, for example due to a jouncing wheel. On an uneven stretch such dynamic loads can occur. With varying loads, in contrast to constant or dynamic loads, self-locking spindle drives can drift in the reverse-driving direction, and for that reason an inhibiting device can be appropriate and can be used advantageously to prevent such drifting.

The spindle drive preferably comprises a roller screw drive designed to have no play, so that low-noise operation of the spindle drive is obtained. For this, individual elements of the spindle drive can be braced against one another. The bracing can be achieved by thrust washers or springs, for example plate springs.

As the electric motor, a preferably suitable design is a brushless Vernier electric motor. This type of electric motor forms a highly efficient electric motor, which compared with conventional electric motors has better volume efficiency. Occupying a smaller volume, a Vernier motor can deliver a higher torque than a conventional electric motor with a correspondingly larger volume. In other words, an electric motor can be made smaller and at the same time have higher power. In the present spindle drive this favors a further reduction of fitting space.

A further aspect of the invention is a steer-by-wire steering system, preferably in the form of a rear-axle steering system for a motor vehicle, which is equipped with a spindle drive that can embody the aforesaid features singly or in combination. Steer-by-wire steering systems have no mechanical connection between the steering-wheel and the steering system. The steering of the wheels or changes of the wheel steering angle are brought about by control signals transmitted from a control unit to the actuators.

BRIEF DESCRIPTION OF THE DRAWINGS

Below, the invention is described with reference to preferred embodiments and to the drawings, which show:

FIG. 3: A schematic exploded representation of the spindle drive, designed as a roller screw drive with roller return.

DETAILED DESCRIPTION OF THE PREFERRED EMBODIMENTS

Figure 1:
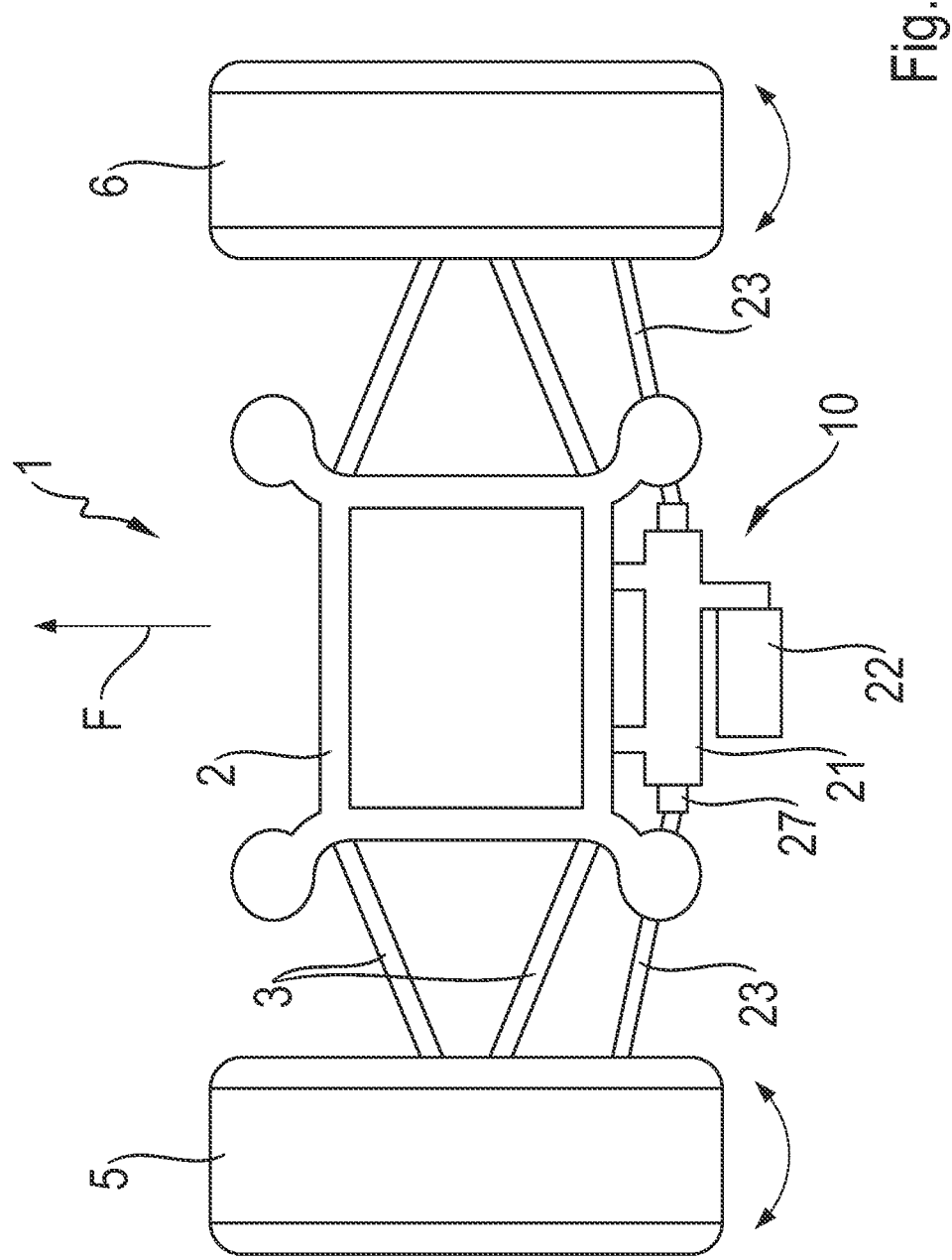
FIG. 1: A schematic view from above, of a rear axle of a vehicle.

The schematic representation according to FIG. 1 shows a vehicle axle 1, in this case represented as a rear axle with a subframe 2, which is fixed to a vehicle structure or which forms the latter and is connected to the body of a motor vehicle. The wheels 5 and 6 are articulated to the subframe 2 by means of control arms 3. The control arms 3 form the wheel suspension for the wheels 5, 6. To the subframe 2 is attached an actuator of a steer-by-wire steering system. The actuator is fixed by its housing 21 to the subframe. In this embodiment, the actuator 10 is a central actuator with a through-going threaded spindle 27, which passes through the housing 21 of the actuator 10. At the ends of the threaded spindle 27 track-rods 23 are articulated, which at the end remote from the actuator 10 are in each case articulated to the wheel carrier (not shown) of the wheels 5 and 6. It can be seen clearly that axial displacement of the threaded spindle 27 to the left or right direction will bring about a change of the wheel steering angle, because the track-rods 23 form a forced connection between the wheel or wheel carrier and the actuator 10. To steer the wheels 5, 6, they are articulated rotatably about their vertical axis on the wheel suspension 3, as indicated by the curved double-arrows under the wheels 5, 6.

Figure 2:
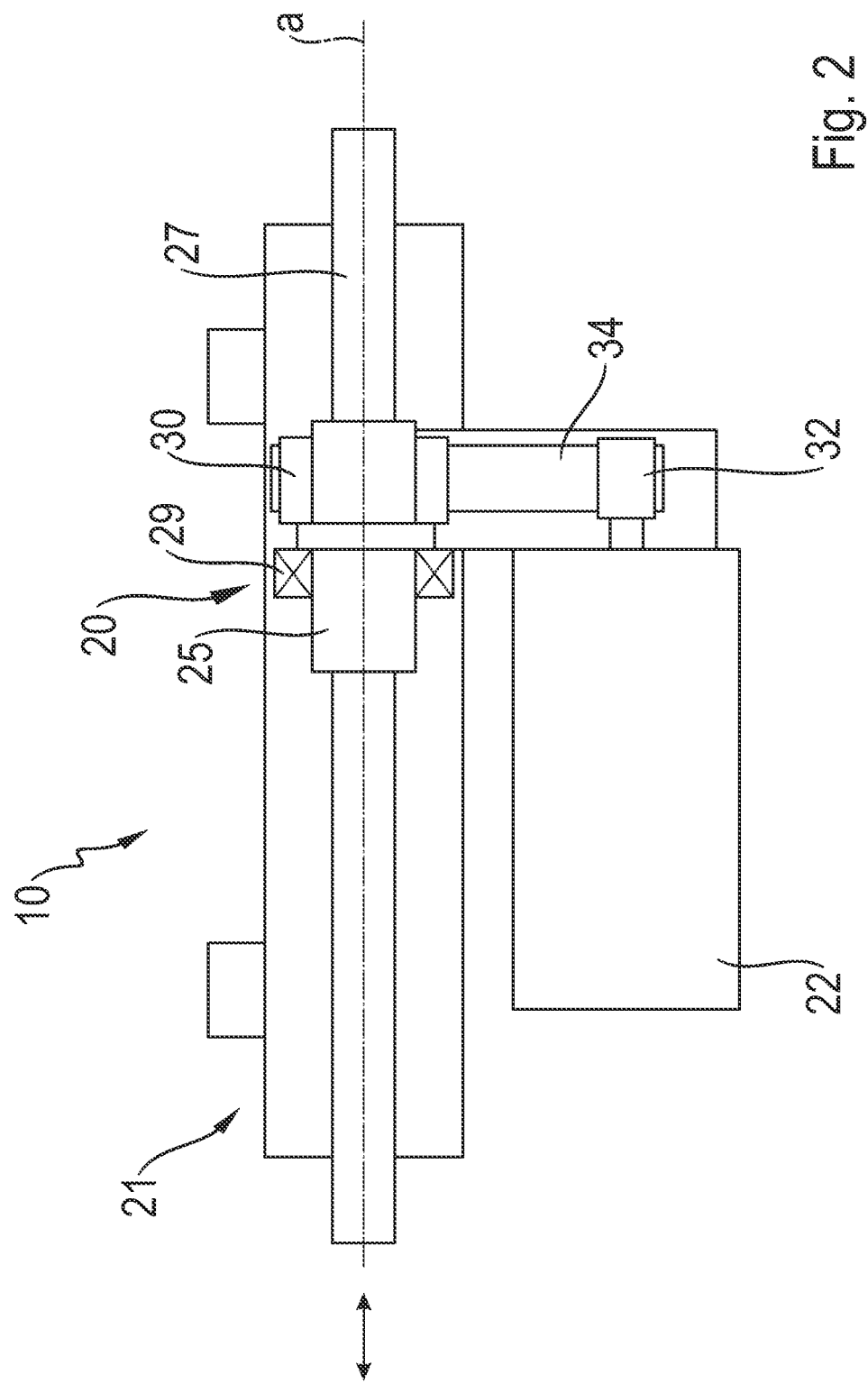
FIG. 2: A schematic view of an actuator and a steer-by-wire steering system.

FIG. 2 shows a schematic representation of the actuator 10 already shown n FIG. 1. The actuator 10 has a housing 21, on which a drive motor 22 with its axis parallel is arranged. In the housing 21 is arranged the spindle drive 20, which comprises the spindle nut 25 and the threaded spindle 27. The spindle nut 25 is mounted positionally fixed but able to rotate relative to the housing by virtue of a roller bearing 29. The threaded spindle 27 passes through the spindle nut 25 coaxially with it. On the side of the spindle nut 25 facing away from the roller bearing 29, a belt wheel 30 is arranged positionally fixed on the spindle nut 25. The electric motor 22 has a drive pinion 32. A drive belt 34 in the form of a toothed belt is wrapped around both the drive pinion 32 and the belt wheel 30, so that when the electric motor or drive motor 22 rotates, the spindle nut 25 is caused to rotate about the longitudinal axis a. Depending on the rotational direction of the spindle nut 25, linear displacement of the threaded spindle 27 takes place in one direction or the other along the longitudinal axis a, as indicated by the double-arrow.

FIG. 3 shows an exploded representation of the roller screw drive with roller return conceived for use in the actuator 10 according to FIGS. 1 and 2. On its inside the spindle nut 25 has an internal thread 26. On the inside of the thread 26 there is in addition arranged an axially extending projection 49. A cage 46 has cut-outs 44a arranged concentrically relative to the longitudinal axis a, and which receive threaded rollers 44. The cut-outs 44a are arranged as elongated slots on the outside of the cage 46. When the cage 46 with the threaded rollers 44 is inside the spindle nut 25, the cage 46 and thus also the threaded rollers 44 are held in position relative to the spindle nut 25 by means of the holding rings 47a, 47b arranged at the ends or faces of the spindle nut 25. When the spindle nut 25 rotates around the threaded spindle 27, then due to the fact that the threaded rollers 44 engage both with the external thread of the spindle 27 and with the internal thread 26 of the spindle nut 25, an axial displacement of the threaded spindle 27 is enabled. This axial displacement corresponds to the driving direction of the threaded spindle. After one turn of the spindle nut 25 the threaded rollers 44, as a function of their thread pitch, will have covered a certain axial path relative to the spindle nut 25. Thus, these have to be returned. In this embodiment, they are lifted by the projection clear off the internal thread and returned axially by a further axial projection (not shown) on the holding ring 47a and thereafter again come into engagement with the internal thread 26 of the spindle nut 25.

In addition a wheel 5, 6 is shown schematically, which can be steered about a vertical axis h. The wheel 5, 6 is mounted rotatably on a wheel carrier 50. The wheel carrier 50 is articulated to a track-rod 23, which at its opposite end is articulated to the end of the threaded spindle 27. If now a lateral force $F_s$ acts on the threaded spindle 27, for example while driving round a curve, this is a force in the reverse-driving direction on the spindle drive 20 which, due to the low efficiency, produces only a very small torque on the spindle nut 25. That torque can be compensated by virtue of the stall torque of the electric motor, so that in the event of a lateral force the wheel steering angle does not change because in the reverse-driving direction the spindle drive is in that way designed to be self-locking. The spindle nut 25 is not rotated.

The actuator 10 shown as an example in FIGS. 1 and 2 is a central actuator which acts on both sides and can produce a steering movement on both of the wheels on an axle as shown in FIG. 1. However, the invention can be used just as well with a so-termed single actuator. In the case of a single actuator the spindle of the single actuator moves in and out of the housing of the single actuator, or in other words the length of the single actuator is variable. If the housing is fixed to the body, for example arranged on or supported by a subframe, then the length variation brings about an adjustment movement in the sense of a steering movement on the wheel carrier of a wheel so that a change of the wheel steering angle of the wheel concerned can take place. In this case a control arm can also be arranged between the wheel carrier and the single actuator.

INDEXES

1 Vehicle axle
2 Subframe, vehicle body
3 Control arm, wheel suspension
5 Wheel
6 Wheel
10 Actuator
20 Spindle drive
21 Housing
22 Drive motor, electric motor
23 Track-rod
25 Spindle nut
26 Internal thread
27 Threaded spindle, spindle
29 Roller bearing
30 Belt wheel
32 Drive pinion
34 Drive belt
44 Threaded rollers
44a Cut-outs
45 Spindle nut
46 Cage
47a Holding ring 47b Holding ring
49 Projection
50 Wheel carrier
a Longitudinal axis
h Vertical axis

The invention claimed is:

1. A spindle drive for an actuator of a steer-by-wire steering system, comprising:
   a linearly displaceable threaded spindle,
   the spindle drive being in the form of a roller screw drive, and the roller screw drive having different efficiencies in a driving direction and in a reverse-driving direction.

2. The spindle drive according to claim 1, wherein in the driving direction the spindle drive has an efficiency high enough so that the spindle drive is not self-locking in the driving direction.

3. The spindle drive according to claim 1, wherein the efficiency of the roller screw drive, in the reverse-driving direction, is low enough so that the spindle drive is essentially self-locking.

4. The spindle drive according to claim 3, wherein, when a maximum substantially axial force acts upon the threaded spindle in the reverse-driving direction, a minimal torque is produced in the spindle drive which corresponds approximately to a stall torque of a drive motor and is equal to the stall torque of the drive motor.

5. The spindle drive according to claim 1, wherein the roller screw drive is configured with a roller return.

6. The spindle drive according to claim 1, wherein an inhibiting unit is provided, which is actuated electromagnetically to lock the spindle drive, and which produces at least one of an interlocking and a frictional coupling between the actuator and at least one of the threaded spindle and a spindle nut.

7. The spindle drive according to claim 1, wherein the roller screw drive is designed to be play-free.

8. The spindle drive according to claim 1, wherein an electric motor of the spindle drive is a Vernier motor.

9. A steer-by-wire steering system for a motor vehicle made with an actuator having a spindle drive according to claim 1.

10. A spindle drive for an actuator of a steer-by-wire steering system, the spindle drive comprising:
    a linearly displaceable threaded spindle,
    the spindle drive being a roller screw drive having a first efficiency in a driving direction and a different second efficiency in a reverse-driving direction.

* * * * *